United States Patent
Fujikura

(10) Patent No.: US 9,217,075 B2
(45) Date of Patent: Dec. 22, 2015

(54) RUBBER COMPOSITION FOR TIRE, AND PNEUMATIC TIRE

(71) Applicant: SUMITOMO RUBBER INDUSTRIES, LTD., Kobe-shi, Hyogo (JP)

(72) Inventor: Keitarou Fujikura, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

(21) Appl. No.: 13/748,168

(22) Filed: Jan. 23, 2013

(65) Prior Publication Data

US 2013/0190426 A1    Jul. 25, 2013

(30) Foreign Application Priority Data

Jan. 24, 2012 (JP) .................. 2012-012194

(51) Int. Cl.

| | |
|---|---|
| *C08L 7/00* | (2006.01) |
| *C08L 1/00* | (2006.01) |
| *C08L 65/00* | (2006.01) |
| *C08K 7/02* | (2006.01) |
| *C08L 21/00* | (2006.01) |
| *C08L 61/06* | (2006.01) |
| *B60C 1/00* | (2006.01) |
| *C08G 8/10* | (2006.01) |
| *C08G 8/34* | (2006.01) |
| *C08L 61/14* | (2006.01) |

(52) U.S. Cl.
CPC ............ *C08L 1/00* (2013.01); *B60C 1/0016* (2013.04); *C08G 8/10* (2013.01); *C08G 8/34* (2013.01); *C08K 7/02* (2013.01); *C08L 7/00* (2013.01); *C08L 21/00* (2013.01); *C08L 61/06* (2013.01); *C08L 61/14* (2013.01); *C08L 65/00* (2013.01); *Y02T 10/862* (2013.01)

(58) Field of Classification Search
CPC ............ C08L 1/00; C08L 1/02; C08L 21/00; C08L 61/06; C08L 61/14; C08L 65/00; C08K 7/02; C08K 7/00; B60C 1/0016; B60C 1/0025; C08G 8/10; C08G 8/34; Y02T 10/862
USPC .................................... 524/9, 35, 13
See application file for complete search history.

(56) References Cited

U.S. PATENT DOCUMENTS

| | | | |
|---|---|---|---|
| 2,140,527 A | 12/1938 | Haynes et al. | |
| 2,486,720 A | 11/1949 | Perkerson | |
| 2,650,891 A | 9/1953 | Buckwalter | |
| 2,905,567 A | 9/1959 | Allen | |
| 3,709,845 A | 1/1973 | Boustany et al. | |
| 3,716,513 A | 2/1973 | Burke, Jr. | |
| 3,959,194 A | 5/1976 | Adelmann | |
| 4,508,860 A | 4/1985 | Hawes | |
| 4,835,216 A | 5/1989 | Morikawa et al. | |
| 5,000,092 A | 3/1991 | Best | |
| 5,017,636 A | 5/1991 | Hattori et al. | |
| 5,290,830 A | 3/1994 | Tung et al. | |
| 5,396,940 A | 3/1995 | Segatta et al. | |
| 5,569,740 A | 10/1996 | Tanaka et al. | |
| 5,908,893 A | 6/1999 | Kawasaki et al. | |
| 5,967,211 A * | 10/1999 | Lucas et al. | 152/209.4 |
| 6,117,545 A | 9/2000 | Cavaille et al. | |
| 6,306,955 B1 | 10/2001 | Kawasaki et al. | |
| 6,376,587 B1 | 4/2002 | Ajiro et al. | |
| 6,489,389 B1 | 12/2002 | Ohta et al. | |
| 6,703,497 B1 | 3/2004 | Ladouce et al. | |
| 7,427,646 B2 | 9/2008 | Kondou | |
| 8,022,136 B2 * | 9/2011 | Yano et al. | 524/571 |
| 8,163,821 B2 | 4/2012 | Hiro | |
| 8,273,804 B2 | 9/2012 | Nishimura | |
| 8,623,956 B2 | 1/2014 | Sugimoto et al. | |
| 8,633,275 B2 | 1/2014 | Sakaki et al. | |
| 8,658,728 B2 | 2/2014 | Ichikawa et al. | |
| 8,658,730 B2 | 2/2014 | Ichikawa | |
| 8,809,450 B2 | 8/2014 | Sakaki et al. | |
| 8,813,798 B2 | 8/2014 | Tsumori et al. | |
| 8,857,482 B2 | 10/2014 | Taguchi et al. | |

(Continued)

FOREIGN PATENT DOCUMENTS

| | | |
|---|---|---|
| CN | 1572825 A | 2/2005 |
| CN | 1692128 A | 11/2005 |

(Continued)

OTHER PUBLICATIONS

JP 2005-068240 A (2005), machine translation, JPO Advanced Industrial Property Network (AIPN).*
JP 2005-075856 A (2005), machine translation, JPO Advanced Industrial Property Network (AIPN).*
"Shinpan Kobunshi Jiten" (Polymer Dictionary, New Edition), 6th Imp., published Mar. 20, 2001, p. 448, with partial translation of lines 21-30 of the left column of p. 448 (3 pages total).
Extended European Search Report, dated Aug. 27, 2010, for European Application No. 08830800.2.
The Chemical Society of Japan, "Hyojun Kagaku Yogo Jiten" (Standard Dictionary of Chemical Terms), 2nd Ed., published Mar. 31, 2005, pp. 672-673, with partial translation of lines 5-9 of the left column of p. 673 (3 pages total).

(Continued)

*Primary Examiner* — Susannah Chung
*Assistant Examiner* — Josephine Chang
(74) *Attorney, Agent, or Firm* — Birch Stewart Kolasch & Birch, LLP

(57) ABSTRACT

Provided are a rubber composition for a tire which makes it possible to improve the handling stability and fuel economy in a well-balanced manner by a simple method without requiring any chemical reaction process for surface treatment of microfibrillated plant fibers; and a pneumatic tire formed from the rubber composition. The rubber composition for a tire contains: a rubber component; microfibrillated plant fibers; a phenol resin; and a curing agent. It is preferable that the rubber component should include at least one selected from the group consisting of natural rubber, modified natural rubber, synthetic rubber, and modified synthetic rubber, and it is preferable that the microfibrillated plant fibers should be cellulose microfibrils.

2 Claims, No Drawings

(56) References Cited

U.S. PATENT DOCUMENTS

| | | |
|---|---|---|
| 8,875,765 B2 | 11/2014 | Tsumori et al. |
| 2003/0060551 A1 | 3/2003 | Mizuno et al. |
| 2003/0083516 A1 | 5/2003 | Korth et al. |
| 2004/0110889 A1 | 6/2004 | Yagi et al. |
| 2004/0266937 A1 | 12/2004 | Yagi et al. |
| 2005/0027060 A1 | 2/2005 | Yagi et al. |
| 2005/0148723 A1 | 7/2005 | Kondou |
| 2005/0234186 A1 | 10/2005 | Kondou |
| 2006/0252879 A1 | 11/2006 | Tanaka et al. |
| 2007/0059232 A1 | 3/2007 | Stenzel et al. |
| 2007/0100061 A1 | 5/2007 | Hattori et al. |
| 2007/0197688 A1 | 8/2007 | Tsukada et al. |
| 2007/0241480 A1 | 10/2007 | Kanenari et al. |
| 2008/0009570 A1 | 1/2008 | Miyazaki |
| 2008/0185087 A1 | 8/2008 | Galimberti et al. |
| 2009/0000721 A1 | 1/2009 | Imoto et al. |
| 2009/0088496 A1 | 4/2009 | Miyasaka et al. |
| 2009/0099281 A1 | 4/2009 | Sakurai et al. |
| 2010/0076118 A1* | 3/2010 | Yano et al. ............ 523/351 |
| 2010/0206444 A1 | 8/2010 | Kawasaki |
| 2010/0294407 A1 | 11/2010 | Kushida |
| 2011/0094648 A1 | 4/2011 | Horiguchi |
| 2011/0094649 A1 | 4/2011 | Miyazaki |
| 2011/0136939 A1 | 6/2011 | Lechtenboehmer et al. |
| 2011/0166254 A1 | 7/2011 | Nishimura |
| 2011/0172339 A1 | 7/2011 | Satou |
| 2011/0178235 A1 | 7/2011 | Sugimoto |
| 2011/0184118 A1 | 7/2011 | Sugimoto et al. |
| 2011/0230613 A1 | 9/2011 | Hiro |
| 2011/0253285 A1 | 10/2011 | Ichikawa et al. |
| 2011/0294949 A1 | 12/2011 | Sakaki et al. |
| 2012/0214911 A1 | 8/2012 | Yano et al. |
| 2013/0030083 A1 | 1/2013 | Taguchi et al. |
| 2013/0066021 A1 | 3/2013 | Ichikawa et al. |
| 2013/0098523 A1 | 4/2013 | Tsumori et al. |
| 2013/0102722 A1 | 4/2013 | Tsumori et al. |
| 2013/0123387 A1 | 5/2013 | Kagawa et al. |

FOREIGN PATENT DOCUMENTS

| | | |
|---|---|---|
| CN | 1832967 A | 9/2006 |
| CN | 1946744 A | 4/2007 |
| CN | 101270219 A | 9/2008 |
| CN | 102245644 A | 11/2011 |
| CZ | 237729 B1 | 10/1985 |
| EP | 0328261 A1 | 8/1989 |
| EP | 0905186 A1 | 3/1999 |
| EP | 1484359 A1 | 12/2004 |
| EP | 1568713 A1 | 8/2005 |
| EP | 1650253 A1 | 4/2006 |
| EP | 1652862 A1 | 5/2006 |
| EP | 1816144 A1 | 8/2007 |
| EP | 2072574 A1 | 6/2009 |
| EP | 2154192 A1 | 2/2010 |
| EP | 2223928 A1 | 9/2010 |
| EP | 2284022 A1 | 2/2011 |
| EP | 2333008 A1 | 6/2011 |
| EP | 2333009 A1 | 6/2011 |
| EP | 2366558 A1 | 9/2011 |
| EP | 2377892 A1 | 10/2011 |
| EP | 2476708 A1 | 7/2012 |
| EP | 2615127 A2 | 7/2013 |
| GB | 164392 A | 6/1921 |
| GB | 240939 A | 10/1925 |
| JP | 4-356205 A | 12/1992 |
| JP | 5-301994 A | 11/1993 |
| JP | 6-87306 A | 3/1994 |
| JP | 6-329702 A | 11/1994 |
| JP | 6-329838 A | 11/1994 |
| JP | 7-149955 A | 6/1995 |
| JP | 7-196850 A | 8/1995 |
| JP | 8-12814 A | 1/1996 |
| JP | 8-143606 A | 6/1996 |
| JP | 11-12306 A | 1/1999 |
| JP | 11-78437 A | 3/1999 |
| JP | 11-129711 A | 5/1999 |
| JP | 11-222012 A | 8/1999 |
| JP | 11-513425 A | 11/1999 |
| JP | 2000-95898 A | 4/2000 |
| JP | 2000-344955 A | 12/2000 |
| JP | 2001-114939 A | 4/2001 |
| JP | 2002-503621 A | 2/2002 |
| JP | 2002-155164 A | 5/2002 |
| JP | 3294901 B2 | 6/2002 |
| JP | 2002-524618 A | 8/2002 |
| JP | 2002-338734 A | 11/2002 |
| JP | 2003-64221 A | 3/2003 |
| JP | 2003-94918 A | 4/2003 |
| JP | 2003-320804 A | 11/2003 |
| JP | 2004-59803 A | 2/2004 |
| JP | 2004-67027 A | 3/2004 |
| JP | 2004-91715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-68240 A | 3/2005 |
| JP | 2005-75856 A | 3/2005 |
| JP | 2005-82622 A | 3/2005 |
| JP | 2005-82766 A | 3/2005 |
| JP | 2005068240 A * | 3/2005 |
| JP | 2005-126604 A | 5/2005 |
| JP | 2005-133025 A | 5/2005 |
| JP | 2005-325206 A | 11/2005 |
| JP | 2005-325307 A | 11/2005 |
| JP | 2006-16622 A | 1/2006 |
| JP | 2006-36926 A | 2/2006 |
| JP | 2006-96926 A | 4/2006 |
| JP | 2006-104455 A | 4/2006 |
| JP | 2006-152045 A | 6/2006 |
| JP | 2006-152171 A | 6/2006 |
| JP | 2006-166211 A | 6/2006 |
| JP | 2006-206837 A | 8/2006 |
| JP | 2006-206864 A | 8/2006 |
| JP | 2006-281744 A | 10/2006 |
| JP | 2006-307018 A | 11/2006 |
| JP | 2007-131730 A | 5/2007 |
| JP | 2007-145898 A | 6/2007 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2008-308615 A | 12/2008 |
| JP | 2009-1680 A | 1/2009 |
| JP | 2009-13196 A | 1/2009 |
| JP | 2009-13197 A | 1/2009 |
| JP | 2009-51955 A | 3/2009 |
| JP | 2009-67929 A | 4/2009 |
| JP | 2009-84564 A | 4/2009 |
| JP | 2009-108308 A | 5/2009 |
| JP | 2009-191132 A | 8/2009 |
| JP | 2009-191198 A | 8/2009 |
| JP | 2009-202865 A | 9/2009 |
| JP | 2009-262835 A | 11/2009 |
| JP | 2010-70747 A | 4/2010 |
| JP | 2010-111785 A | 5/2010 |
| JP | 2010-138359 A | 6/2010 |
| JP | 2010-144001 A | 7/2010 |
| JP | 2010-173513 A | 8/2010 |
| JP | 2010-174169 A | 8/2010 |
| JP | 2010-242023 A | 10/2010 |
| JP | 2010-248282 A | 11/2010 |
| JP | 4581116 B2 | 11/2010 |
| JP | 2010-275642 A | 12/2010 |
| JP | 2011-63651 A | 3/2011 |
| JP | 2011-153221 A | 8/2011 |
| JP | 2011-153222 A | 8/2011 |
| JP | 2011-157473 A | 8/2011 |
| JP | 2011-225680 A | 11/2011 |
| JP | 2011-231214 A | 11/2011 |
| JP | 2011-256311 A | 12/2011 |
| JP | 2012-1571 A | 1/2012 |

(56) References Cited

FOREIGN PATENT DOCUMENTS

| WO | WO 03/082925 A1 | 10/2003 |
| WO | WO 2005/012365 A1 | 2/2005 |
| WO | WO 2005/092971 A1 | 10/2005 |
| WO | WO 2009/096113 A1 | 8/2009 |
| WO | WO 2010/071106 A1 | 6/2010 |
| WO | WO 2011/049162 A1 | 4/2011 |
| WO | WO 2011/096399 A1 | 8/2011 |

OTHER PUBLICATIONS

Tokai Carbon Co., Ltd., "SEAST SO (FEF)", Physicochemical Properties, Product Information, retrieved Feb. 20, 2014, 3 pages, http://www.tokaicarbon.co.jp/en/products/carbon_b/seast/.

Food Chemicals Codex (7th Edition), Monographs/Calcium Lignosulfonate, First Published: Prior to FCC 6, Last Revision: First Supplement, FCC 6, 2010, p. 142.

Database WPI Week 200570, Thomson Scientific, London, GB; AN 2005-684076, XP-002673748, Apr. 18, 2012, 2 pages.

International Search Report for International Application No. PCT/JP2009/070824, dated Mar. 9, 2010.

International Search Report for International Application No. PCT/JP2011/063248, dated Sep. 13, 2011.

Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.

* cited by examiner

RUBBER COMPOSITION FOR TIRE, AND PNEUMATIC TIRE

TECHNICAL FIELD

The present invention relates to a rubber composition for a tire, and a pneumatic tire formed from the rubber composition.

BACKGROUND ART

As a technique of enhancing the hardness and rigidity of rubber compositions to improve the handling stability, Patent Literature 1, for example, discloses the addition of a phenol resin and a curing agent for curing the resin into a rubber composition, followed by performing a crosslinking reaction of the phenol resin while vulcanizing the rubber composition in the vulcanization stage. Alternatively, it has been known that microfibrillated plant fibers such as cellulose fibers are compounded into a rubber composition.

However, if a phenol resin or microfibrillated plant fibers are compounded as a reinforcing material into a rubber composition, the energy loss (heat build-up) caused when the rubber composition is deformed tends to increase due to friction between the rubber component and the reinforcing material as well as friction between the reinforcing materials. Therefore, when the rubber composition containing the reinforcing material is used in a tire, which is a typical application of rubber compositions, the rolling resistance tends to increase to cause a reduction in fuel economy.

Microfibrillated plant fibers are hydrophilic materials and thus are poorly compatible with the rubber component. Accordingly, if microfibrillated plant fibers are compounded into a rubber composition, the microfibrillated plant fibers are insufficiently adhered to the rubber component, and the rubber composition is likely to be broken on its deformation. Further, energy loss in the interface between the rubber component and the microfibrillated plant fibers tends to be caused.

As described above, if a phenol resin or microfibrillated plant fibers are used as a reinforcing material, the energy loss will be increased, and hence further improvement is needed on this point. Microfibrillated plant fibers are also poorly adhered to the rubber component and hence further improvement is needed on this point. Therefore, unless these properties are improved, they are difficult to apply to tires for various uses and in particular those used for a long period of time under harsh conditions. In recent years, there has been proposed a technique of enhancing the compatibility of pulp with the rubber component by chemically treating pulp with a silane coupling agent containing an amino group. However, this technique requires a chemical reaction process and therefore a simpler technique is desired.

CITATION LIST

Patent Literature

Patent Literature 1: JP 2005-68240 A

SUMMARY OF INVENTION

Technical Problem

The present invention has an object to solve the above problem and provide a rubber composition for a tire which makes it possible to improve the handling stability and fuel economy in a well-balanced manner by a simple method without requiring any chemical reaction process for surface treatment of microfibrillated plant fibers, and a pneumatic tire formed from the rubber composition.

Solution to Problem

The present invention relates to a rubber composition for a tire, containing: a rubber component; microfibrillated plant fibers; a phenol resin; and a curing agent.

It is preferable that the rubber component should include at least one selected from the group consisting of natural rubber, modified natural rubber, synthetic rubber, and modified synthetic rubber.

It is preferable that the microfibrillated plant fibers should be cellulose microfibrils.

It is preferable that the microfibrillated plant fibers should have an average fiber diameter of 10 μm or less.

It is preferable that the microfibrillated plant fibers should be contained in an amount of 1 to 100 parts by mass with respect to 100 parts by mass of the rubber component.

It is preferable that the phenol resin should be contained in an amount of 1 to 50 parts by mass with respect to 100 parts by mass of the rubber component.

It is preferable that the curing agent should be hexamethylenetetramine.

It is preferable that the curing agent should be contained in an amount of 1 to 50 parts by mass with respect to 100 parts by mass of the phenol resin.

The present invention also relates to a pneumatic tire formed from the rubber composition.

Advantageous Effects of Invention

According to the present invention, the rubber composition for a tire contains a rubber component, microfibrillated plant fibers, a phenol resin, and a curing agent, and therefore a pneumatic tire can be provided whose handling stability and fuel economy are improved in a well-balanced manner.

DESCRIPTION OF EMBODIMENTS

The rubber composition of the present invention contains a rubber component, microfibrillated plant fibers, a phenol resin, and a curing agent. The adhesion in the interface between the rubber component and microfibrillated plant fibers is improved by using microfibrillated plant fibers together with a phenol resin, and therefore the energy loss in the interface will be reduced. Also, the reinforcement effects of the phenol resin and the microfibrillated plant fibers are synergistically enhanced, and therefore sufficient reinforcement can be assured even if the amount of reinforcing materials is reduced. All these effects enable a highly rigid rubber composition with less energy loss. Further, by using the rubber composition for production of tires, pneumatic tires can be provided whose handling stability and fuel economy are improved in a well-balanced manner.

It is preferable that the rubber component should include at least one selected from the group consisting of natural rubber, modified natural rubber, synthetic rubber, and modified synthetic rubber. As the rubber component, for example, diene rubbers may be mentioned and specific examples thereof include natural rubber (NR), butadiene rubber (BR), styrene-butadiene copolymer rubber (SBR), isoprene rubber (IR), butyl rubber (IIR), acrylonitrile-butadiene rubber (NBR), acrylonitrile-styrene-butadiene copolymer rubber, chloroprene rubber, styrene-isoprene copolymer rubber, styrene-isoprene-butadiene copolymer rubber, isoprene-butadiene copolymer rubber, chlorosulfonated polyethylene, and modified natural rubber such as epoxidized natural rubber (ENR), hydrogenated natural rubber, and deproteinized natural rubber. Further, examples of rubber materials other than diene rubbers include ethylene-propylene copolymer rubber, acrylic rubber, epichlorohydrin rubber, polysulfide rubber, silicone rubber, fluororubber, urethane rubber, and the like. These rubber materials may be used alone, or may be used as a blend of two or more species. With respect to the blending ratio of the blend, rubber materials may appropriately be blended according to the particular applications. Among the examples, NR, BR, SBR, IR, IIR, and ENR are preferred and NR is more preferred because they are advantageous in terms of versatility and cost and because good workability is shown at the time of mixing with the microfibrillated plant fibers.

As the microfibrillated plant fibers, cellulose microfibrils are preferred in terms of better reinforcement. Examples of the cellulose microfibrils include those derived from natural products such as wood, bamboo, hemp, jute, kenaf, crop wastes, cloth, recycled pulp, wastepaper, bacterial cellulose, and ascidian cellulose.

The method of producing the microfibrillated plant fibers is not particularly limited and for example, a method may be mentioned in which a raw material for the cellulose microfibrils is chemically treated with a chemical such as sodium hydroxide and then mechanically ground or beaten by a machine such as a refiner, a twin-screw kneader (twin-screw extruder), a twin-screw kneading extruder, a high-pressure homogenizer, a media agitating mill, a stone mill, a grinder, a vibrating mill, or a sand grinder. In this method, since lignin is separated from the raw material by chemical treatment, microfibrillated plant fibers containing substantially no lignin are obtained.

The microfibrillated plant fibers preferably have an average fiber diameter of 10 μm or less, more preferably 5 μm or less, further preferably 1 μm or less, and particularly preferably 0.5 μm or less because the rubber reinforcing effect is then good. Although the lower limit of the average fiber diameter of microfibrillated plant fibers is not particularly limited, it is preferably 4 nm or more from the viewpoint that in the case where an aqueous dispersion of the microfibrillated plant fibers and the rubber component are mixed, deterioration of workability due to deterioration of drainage can be suppressed.

The microfibrillated plant fibers preferably have an average fiber length of 5 mm or less, and more preferably 1 mm or less, but preferably of 1 μm or more, and more preferably 50 μm or more. If the average fiber length is less than the lower limit or if the average fiber length exceeds the upper limit, the same tendency is shown as for the average fiber diameter described above.

The average fiber diameter and the average fiber length of microfibrillated plant fibers can be measured by image analysis of scanning electron micrographs, image analysis of transmission electron micrographs, analysis of X-ray scattering data, a pore electric resistance method (Coulter principle method), or the like.

The microfibrillated plant fibers are preferably contained in an amount of 1 part by mass or more, more preferably 3 parts by mass or more, and further preferably 5 parts by mass or more, but preferably in an amount of 100 parts by mass or less, and more preferably 20 parts by mass or less, with respect to 100 parts by mass of the rubber component. In the range, a good balance is achieved between the rubber reinforcing effect and the energy loss, and good yields of the materials and good workability are achieved in the process in which the microfibrillated plant fibers are combined with the rubber component.

The phenol resin can be obtained by a reaction between a phenol compound and an aldehyde compound. Examples of the phenol resin include novolak resins obtainable by the reaction of the above two compounds under acidic conditions and resole resins obtainable by the reaction of the above two compounds in the presence of an alkali catalyst. Also usable as the phenol resin are modified phenol resins formed by modification of phenol resins with cashew varnish, oil or the like. Among these, in terms of better compatibility with the rubber component, novolak resins and modified phenol resins are preferred, modified novolak resins are more preferred, and cashew-modified novolak resins are further preferred.

The phenol resin is preferably contained in an amount of 1 part by mass or more, and more preferably 3 parts by mass or more, but preferably in an amount of 50 parts by mass or less, and more preferably 25 parts by mass or less, with respect to 100 parts by mass of the rubber component. In the range, a good balance is achieved between the rubber reinforcing effect and the energy loss.

The rigidity of the rubber composition of the present invention is synergistically enhanced by using the microfibrillated plant fibers together with the phenol resin. Therefore the reinforcing material content can be reduced so that the fuel economy can be improved, while good handling stability is maintained. The total content of the microfibrillated plant fibers and the phenol resin is preferably 2 parts by mass or more, and more preferably 6 parts by mass or more, but is preferably 150 parts by mass or less, more preferably 45 parts by mass or less, further preferably 30 parts by mass or less, and particularly preferably 25 parts by mass or less, with respect to 100 parts by mass of the rubber component.

The curing agent is not particularly limited as long as it hardens the phenol resin in the vulcanization step, and examples thereof include hexamethylenetetramine, melamine, and derivatives of melamine (e.g. methylol melamine, hexamethoxymethylmelamine, hexamethylolmelaminepentamethyl ether, hexamethoxymethylol melamine). Among these, hexamethylenetetramine is preferred because it is highly effective in increasing the hardness of the phenol resin.

The curing agent is preferably contained in an amount of 1 part by mass or more, more preferably 5 parts by mass or more, and further preferably 7 parts by mass or more, with respect to 100 parts by mass of the phenol resin. If the amount of the curing agent is less than 1 part by mass, the phenol resin may not be sufficiently cured. The amount of the curing agent is preferably 50 parts by mass or less, more preferably 30 parts by mass or less, and further preferably 15 parts by mass or less, with respect to 100 parts by mass of the phenol resin. If the amount exceeds 50 parts by mass, the phenol resin may be non-uniformly cured.

The rubber composition of the present invention may optionally contain compounding ingredients conventionally used in the rubber industry as needed, in addition to the components described above. Examples of the compounding ingredients include fillers (e.g. carbon black, silica), silane coupling agents, vulcanizing agents, stearic acid, vulcanization accelerators, vulcanization accelerator aids, oil, wax, and antioxidants.

The rubber composition of the present invention can be prepared by a usual method. Specifically, for example, ingredients described above are kneaded by an apparatus such as a Banbury mixer, a kneader, or an open roll mill, and then vulcanized, whereby a rubber composition can be prepared. Also, the rubber composition is preferably prepared from a masterbatch prepared by mixing rubber latex and an aqueous dispersion of microfibrillated plant fibers because the microfibrillated plant fibers can be easily dispersed into the rubber component.

The rubber composition according to the present invention is usable for tire components and can be suitably used especially for treads (particularly, base treads having a two-layer structure) and sidewalls.

The pneumatic tire according to the present invention can be formed from the rubber composition by a known method. Specifically, an unvulcanized rubber composition with additives compounded as needed is extruded and processed into the shape of a tire component, and then molded in a tire building machine by a usual method to form an unvulcanized tire. The unvulcanized tire is then heated and pressurized in a vulcanizer to produce a tire.

The pneumatic tire according to the present invention can be suitably used for passenger cars, trucks and buses, and the like.

EXAMPLES

The present invention will be more specifically described with reference to examples. However, the present invention is not limited only thereto.

Hereinafter, various chemicals used in the examples, comparative examples, and reference example will be collectively described.

Natural rubber latex: HYTEX HA (natural rubber latex manufactured by Golden Hope Plantations, solid content: 60% by mass, average particle size: 1 μm)

Microfibrillated plant fibers: CELISH KY-100G manufactured by Daicel Corporation (average fiber length: 0.5 mm, average fiber diameter: 0.02 μm, solid content: 10% by mass)

Masterbatches 1 to 3: prepared in the following Production Examples

Phenol resin: Sumilite Resin PR12686 manufactured by SUMITOMO BAKELITE CO., LTD. (cashew-modified novolak resin)

Antioxidant: NOCRAC 6C manufactured by Ouchi Shinko Chemical Industrial Co., Ltd.

Stearic acid: stearic acid beads "TSUBAKI" manufactured by NOF Corporation

Zinc oxide: zinc oxide #2 manufactured by Mitsui Mining & Smelting Co., Ltd.

Sulfur: powder sulfur manufactured by Tsurumi Chemical Industry Co., Ltd.

Vulcanization accelerator: NOCCELER DM manufactured by Ouchi Shinko Chemical Industrial Co., Ltd.

Curing agent: NOCCELER H manufactured by Ouchi Shinko Chemical Industrial Co., Ltd. (hexamethylenetetramine)

Production Example 1

Preparation of Masterbatch 1

According to the formulation in Table 1, microfibrillated plant fibers were agitated and dispersed in water for 1 hour at 24,000 rpm by using a high-speed homogenizer (batch homogenizer T65D Ultra-Turrax (Ultra-Turrax T25) manufactured by IKA) and subsequently natural rubber latex was added thereto and the fibers were further agitated and dispersed for 30 minutes. The resulting mixture was solidified with a 5% by mass aqueous solution of formic acid, washed with water, and then dried in an oven heated at 40° C. to give a masterbatch 1.

Production Example 2

Preparation of Masterbatch 2

According to the formulation in Table 1, a masterbatch 2 was obtained in the same manner as in the preparation of the masterbatch 1.

Production Example 3

Preparation of Masterbatch 3

A masterbatch 3 was obtained by solidifying natural rubber latex as it is with a 5% by mass aqueous solution of formic acid, washing it with water, and then drying it in an oven heated at 40° C.

TABLE 1

|  | Masterbatch 1 | Masterbatch 2 | Masterbatch 3 |
| --- | --- | --- | --- |
| Microfibrillated plant fibers (g) | 300 | 150 | — |
| Water (g) | 2700 | 1350 | — |
| Natural rubber latex (g) | 500 | 500 | 500 |

Preparation of Vulcanized Rubber Compositions

According to the formulation in Table 2, each masterbatch was mixed and kneaded with chemicals other than the vulcanization accelerator, sulfur and curing agent for 3 minutes at 88 rpm by using a 250-cc internal mixer heated to 135° C., and then the kneaded rubber mixture was discharged. To the rubber mixture were added the vulcanization accelerator, sulfur and curing agent and they were kneaded for 5 minutes by a 6-inch open roll mill at 60° C. and 24 rpm to give an unvulcanized rubber composition. By press-heating the thus obtained unvulcanized rubber compositions at 150° C., vulcanized rubber compositions corresponding to the Examples, Comparative Examples, and Reference Example were obtained.

Examples 1 to 4, Comparative Examples 1 to 5, and Reference Example 1

Evaluations shown below were performed on the vulcanized rubber compositions prepared by the above method. Here, indices in the property data shown in Table 2 were calculated by the formulae described later, with Reference Example 1 being taken as a reference formulation.

(Hardness Test)

In accordance with JIS K 6253 "Rubber, vulcanized or thermoplastic—Determination of hardness", the rubber hardness was determined with a type A durometer. The index of rubber hardness was calculated by the following formula:

(Index of rubber hardness)=(Rubber hardness of each formulation)/(Rubber hardness of reference formulation)×100.

The larger the index of rubber hardness is, the higher the rubber hardness is.

(Tensile Test)

The tensile stress at 100% was measured in accordance with JIS K 6251 "Rubber, vulcanized or thermoplastic—Determination of tensile stress-strain properties". The index of tensile stress at 100% was calculated by the following formula:

(Index of tensile stress at 100%)=(Tensile stress at 100% in each formulation)/(Tensile stress at 100% in reference formulation)×100.

The larger the index is, the more favorably the vulcanized rubber composition is reinforced, which indicates that the rubber composition is more rigid.

(Indices of Handling Stability and Rolling Resistance)

Test pieces for measurement were cut from 2-mm-thick rubber slab sheets of the vulcanized rubber compositions prepared by the above method, and the E* (complex modulus) and tan δ (loss tangent) of each test piece for measurement were measured using a viscoelastic spectrometer VES (manufactured by Iwamoto Seisakusho Co., Ltd.) under the conditions of temperature 70° C., initial strain 10%, dynamic strain 2%, and frequency 10 Hz. The indices of handling stability and of rolling resistance were calculated by the following formulae:

(Index of handling stability)=(E* of each formulation)/(E* of reference formulation)×100;

(Index of rolling resistance)=(tan δ of each formulation)/(tan δ of reference formulation)×100.

The larger the index of handling stability is, the better the handling stability will be when the rubber composition is used in a pneumatic tire. The smaller the index of rolling resistance is, the better the performance in terms of rolling resistance (fuel economy) will be when the rubber composition is used in a pneumatic tire.

TABLE 2

| | | Examples | | | | Comparative Examples | | | | | Reference Example |
|---|---|---|---|---|---|---|---|---|---|---|---|
| | | 1 | 2 | 3 | 4 | 1 | 2 | 3 | 4 | 5 | 1 |
| Formulation (part(s) by mass) | Masterbatch 1 | 110 | — | 110 | — | 110 | — | — | — | — | — |
| | Masterbatch 2 | — | 105 | — | 105 | — | 105 | — | — | — | — |
| | Masterbatch 3 | — | — | — | — | — | — | 100 | 100 | 100 | 100 |
| | Phenol resin | 10 | 10 | 5 | 5 | — | — | 10 | 5 | 20 | — |
| | Antioxidant | 2 | 2 | 2 | 2 | 2 | 2 | 2 | 2 | 2 | 2 |
| | Stearic acid | 1.6 | 1.6 | 1.6 | 1.6 | 1.6 | 1.6 | 1.6 | 1.6 | 1.6 | 1.6 |
| | Zinc oxide | 2.5 | 2.5 | 2.5 | 2.5 | 2.5 | 2.5 | 2.5 | 2.5 | 2.5 | 2.5 |
| | Sulfur | 1.6 | 1.6 | 1.6 | 1.6 | 1.6 | 1.6 | 1.6 | 1.6 | 1.6 | 1.6 |
| | Vulcanization accelerator | 1 | 1 | 1 | 1 | 1 | 1 | 1 | 1 | 1 | 1 |
| | Curing agent | 1 | 1 | 0.5 | 0.5 | — | — | 1 | 0.5 | 2 | — |
| Vulcanization temperature (° C.) | | 150 | 150 | 150 | 150 | 150 | 150 | 150 | 150 | 150 | 150 |
| Reinforcing material content | Microfibrillated plant fibers | 10 | 5 | 10 | 5 | 10 | 5 | — | — | — | — |
| | Phenol resin | 10 | 10 | 5 | 5 | — | — | 10 | 5 | 20 | — |
| (part(s) by mass) | Total | 20 | 15 | 15 | 10 | 10 | 5 | 10 | 5 | 20 | — |
| Evaluation | Index of rubber hardness | 217 | 191 | 189 | 169 | 134 | 120 | 137 | 123 | 157 | 100 |
| | Index of tensile stress at 100% | 1451 | 887 | 1099 | 592 | 817 | 451 | 352 | 239 | 493 | 100 |
| | Index of handling stability | 1264 | 713 | 938 | 690 | 690 | 527 | 217 | 140 | 264 | 100 |
| | Index of rolling resistance | 224 | 159 | 155 | 134 | 152 | 128 | 176 | 148 | 231 | 100 |

As shown in Table 2, the results of Example 1, Comparative Example 1, Comparative Example 3, and Reference Example 1 demonstrate that by using microfibrillated plant fibers together with a phenol resin, the handling stability was synergistically improved while the reduction in fuel economy was smaller than expected. When the Examples in which microfibrillated plant fibers and a phenol resin were used together are compared with the Comparative Examples in which these components were not used together, provided that the total content of reinforcing materials was the same, the Examples had comparable or higher levels of handling stability as well as good fuel economy.

The invention claimed is:

1. A rubber composition for a tire, said rubber composition comprising:
   a rubber component comprising natural rubber;
   microfibrillated plant fibers which are not chemically surface-treated, said microfibrillated plant fibers having an average fiber diameter of 0.02 μm, wherein said microfibrillated plant fibers are cellulose microfibrils;
   a cashew-modified novolak resin; and
   a hexamethylenetetramine curing agent,
      wherein said microfibrillated plant fibers are contained in an amount of 1 to 100 parts by mass with respect to 100 parts by mass of the rubber component, wherein said cashew-modified novolak resin is contained in an amount of 1 to 50 parts by mass with respect to 100 parts by mass of the rubber component, and wherein said curing agent is contained in an amount of 1 to 50 parts by mass with respect to 100 parts by mass of the cashew-modified novolak resin.

2. A pneumatic tire formed from the rubber composition according to claim 1.

* * * * *